March 3, 1936.   J. O. GRADY   2,032,698
WEATHER STRIP
Filed March 13, 1935
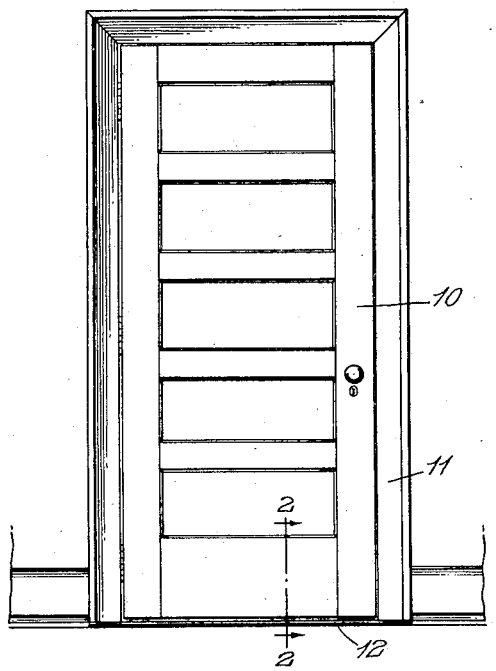
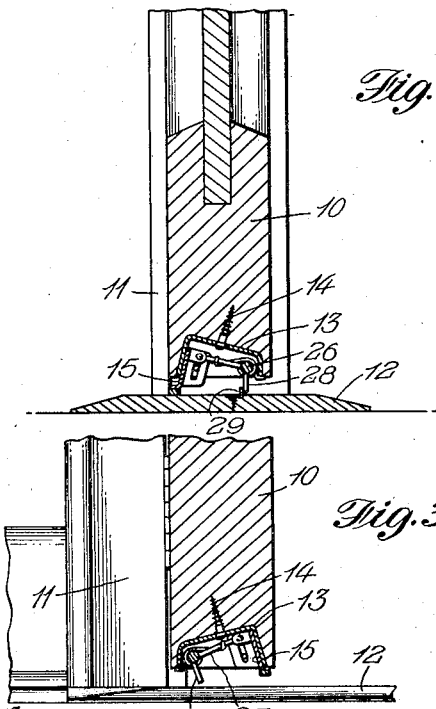
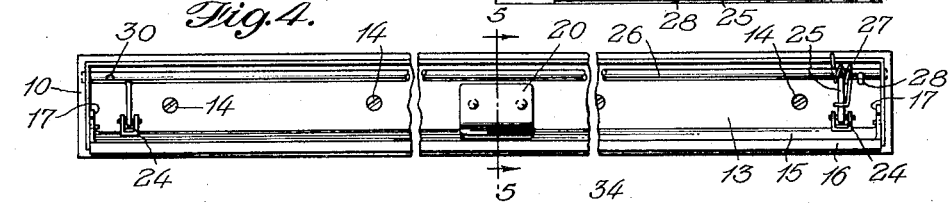
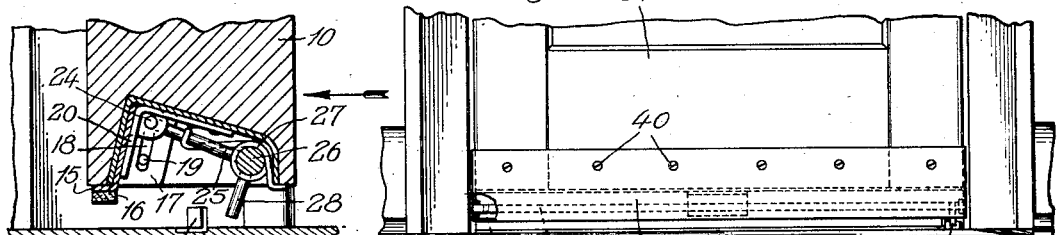
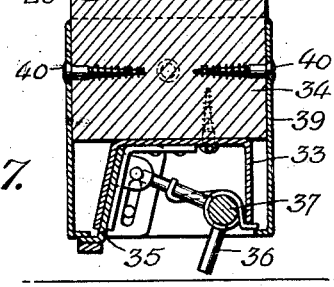
INVENTOR
J. O. Grady
BY
ATTORNEY Patented Mar. 3, 1936

2,032,698

UNITED STATES PATENT OFFICE 2,032,698

WEATHER STRIP

John O. Grady, Arab, Ala.

Application March 13, 1935, Serial No. 10,927

6 Claims. (Cl. 20—67)

This invention relates to a weather strip for doors, windows and the like, and in general to sealing means for spaces between the edges of a closure member and the frame cooperating with such member.

An object of the invention is to provide sealing means of simple and effective character for weather-proofing or sound-proofing doors, windows, shutters or other pivoted or movable members with respect to their frames.

Another object of the invention is to provide a slidable sealing strip adapted to be carried by a door, window or the like and to be projected into engagement with the door frame or window frame when the closure member is moved to the closed position.

A further object of the invention is to provide a weather strip of simple and rugged construction, composed of few parts and adapted to operate satisfactorily for a long period of service.

Other objects and advantages of the invention will appear from the following description of the preferred embodiments thereof shown in the accompanying drawing, wherein:

Fig. 1 is a view of a door and door frame of conventional character to which the invention is applied.

Fig. 2, a sectional view of the lower portion of the door and of the weather strip drawn to an enlarged scale, the section being taken on line 2—2 of Fig. 1, Fig. 3, a similar view with the door in the open position, Fig. 4, a bottom plan view of the door showing the weather strip mounted in a recess therein, Fig. 5, a sectional view similar to Figs. 2 and 3 to an enlarged scale, and Figs. 6 and 7 are elevational and sectional views of a modification.

Referring to Figs. 1 to 5, the sealing strip embodying the invention is shown used as a weather strip for a door 10 mounted in a door frame 11, the weather strip being adapted to engage the door sill 12.

Obviously the invention may be applied to windows, shutters or other movable closures and may be utilized for weather-stripping, sound-proofing or other purposes wherein a seal is desired between a closure and its frame.

As shown in Figs. 2, 3, and 5 the weather strip is mounted in a channel member or casing 13 which may be disposed within a recess in the bottom or other edge of the door. The casing may be secured to the door in any suitable manner, as for example by screws 14. The sealing strip or weather strip in the embodiment shown for purposes of illustration comprises a slidable strip member 15 substantially co-extensive with the edge of the door in which the strip is mounted, and preferably provided with a strip of felt 16 adapted to engage the door sill 12.

The weather strip member 15 is preferably provided with offset end portions 17 adjacent the ends of the casing 13. The offset ends 17 of the weather strip are slotted as indicated at 18 to receive guide pins 19 projecting inwardly from the ends of the casing to aid in supporting and guiding the weather strip. A guide member 20 secured to the casing 13 and engaging the inside surface of the weather strip 15 intermediate the ends of said strip may also be provided if desired to support and guide the same. The weather strip is normally retracted from the position shown in Fig. 2 in which it is in engagement with the door sill to the position shown in Figs. 3 and 5.

The weather strip member 15 is pivotally connected at the points 24 to operating members 25, preferably consisting of a plurality of bar members attached to or integral with a pivoted rod 26 extending the length of the casing 13 and journaled at its ends in the end walls thereof. A spring 27 surrounding the rod 26 is provided for the purpose of holding the weather strip member 15 in retracted position as shown in Figs. 3 and 5.

In order to actuate the weather strip into engagement with the door sill 12 when the door 10 is closed, suitable means is provided for turning the actuating rod 26 upon closing the door. In the modification shown by way of illustration, an operating pin or lug 28 is threaded into or formed integral with the actuating rod 26 and extends into the proximity of a portion of the door frame, for example, the door sill 12. A stop member 29 is provided upon the door frame in position to engage the operating lug 28 when the door reaches closed position, thereby turning the operating members 25 and 26 and actuating the weather strip 15 into contact with the door sill to effect a tight seal.

It will be apparent that the described construction provides a weather strip or sealing means of a simple and rugged character, effective for its intended purpose and readily mounted in position upon a door or the like. In order that the weather strip may be utilized with doors hinged on either the left or the right-hand side, the rod 26 is provided with a threaded aperture 30 at the opposite end from that in which the pin 28 is mounted whereby said pin may be removed from one end of the weather strip and mounted at the other end thereof. The weather strip may be of any desired length and arranged to cooperate with any side or edge of the door by a slight re-arrangement of the operating lug 28 and stop member 29.

Various modifications of the specific structure shown and described may be made without departing from the scope of the invention. For example, in Figs. 6 and 7 a modification is shown in which the weather strip casing 33 is mounted directly upon the bottom face of the door 34. The slidable weather strip or sealing strip 35 and the actuating members 36 and 37 are similar in construction and arrangement to the corresponding elements shown in the modification described above, the actuating lug 36 being mounted if desired in the aperture 38 in the case of a door that is hinged on the opposite side from that shown. The casing and weather strip is concealed behind the cover strips 39 secured by the screws 40 to the lower end of the door. This construction is not as desirable from the standpoint of appearance but is more easily mounted upon the door, window, or the like.

Other modifications will occur to those skilled in the art and are intended to come within the scope of the invention if within the terms of the appended claims.

I claim:—

1. In combination with a door or the like and a frame therefor, means for sealing the space between an edge of said door and the frame comprising a slidable sealing strip mounted on the door and engageable with the frame, guiding means for said strip at the ends thereof, a pivoted rod operating member on the door for said strip, a downwardly extending lug on said rod, and a stop member on the frame in the path of movement of said lug and arranged to actuate the operating member to move the sealing strip to sealing position.

2. In combination with a door or the like and the frame therefor, means for sealing the space at the edge of the door comprising a slidable sealing strip mounted on the door, a guide strip secured to the door and engaging the surface of said slidable strip at an intermediate position for guiding and supporting the same, fixed guide members engaging the ends of said slidable strip, and a pivoted operating member connected to said strip for projecting the same into operative position.

3. In combination with a door or the like, a weather strip mounted on one edge of the door, said weather strip including a slidable sealing strip, intermediate and end guide means for said strip, a pivoted rod extending the length of the door, and cross bars connecting said pivoted bar to said strip.

4. In combination with a door or the like, a weather strip mounted on one edge of the door and comprising a slidable sealing strip having angularly disposed end portions and guiding means for the strip engaging the end portions thereof.

5. In combination with a door or the like, a weather strip mounted on one edge of the door and comprising a slidable sealing strip having angularly disposed end portions, and fixed guiding means for the strip engaging the end portions thereof.

6. In combination with a door or the like, a weather strip mounted on one edge of the door and comprising a channel-shaped casing, a slidable sealing strip in said casing, said strip having off-set ends engaging the ends of the casing, guide pins projecting inwardly from the ends of the casing and engaging said off-set ends of the weather strip and means for projecting the weather strip from and retracting it into the casing.

JOHN O. GRADY.